United States Patent
Hwang

(10) Patent No.: US 7,179,129 B1
(45) Date of Patent: Feb. 20, 2007

(54) 2-IN-1 SD TYPE MEMORY CARD ADAPTER

(76) Inventor: Chin-hwa Hwang, 2F., No. 10, Lane 94, Dazhi st., Taipei City (TW)

( * ) Notice: Subject to any disclaimer, the term of this patent is extended or adjusted under 35 U.S.C. 154(b) by 0 days.

(21) Appl. No.: 11/484,629

(22) Filed: Jul. 12, 2006

(51) Int. Cl.
*H01R 24/00* (2006.01)

(52) U.S. Cl. ............... 439/630; 439/945; 439/638

(58) Field of Classification Search .......... 439/630, 439/631, 945, 638
See application file for complete search history.

(56) References Cited

U.S. PATENT DOCUMENTS

| | | | |
|---|---|---|---|
| 6,438,638 B1 * | 8/2002 | Jones et al. | 710/301 |
| 6,738,259 B2 * | 5/2004 | Le et al. | 361/737 |
| 6,751,694 B2 * | 6/2004 | Liu et al. | 710/301 |

* cited by examiner

Primary Examiner—Tho D. Ta
Assistant Examiner—Vanessa Girardi
(74) Attorney, Agent, or Firm—Bacon & Thomas, PLLC

(57) ABSTRACT

A 2-in-1 card-insertion type memory card adapter meeting the size of an SD card and being provided thereon with a plurality of electric conducting sheets meeting the transmission specification of the SD car, the adapter has a fitting groove; wherein the fitting groove can afford direct insertion of a Mini SD card therein for positioning, alternatively, it can afford positioning therein of a positioning rack meeting the size of the Mini SD card, the positioning rack can afford positioning therein of a Micro SD card, so that the Micro SD card can indirectly positioned in the fitting groove; the fitting groove has therein a first pin set and a second pin set in connection with windows for a plurality of electric conducting sheets, the first pin set is for connecting a Mini SD card, and the second pin set is for connecting a Micro SD card.

8 Claims, 6 Drawing Sheets

# 2-IN-1 SD TYPE MEMORY CARD ADAPTER

BACKGROUND OF THE INVENTION

1. Field of the Invention

The present invention relates to a 2-in-1 card-insertion type memory card adapter, and especially to an adapter for converting a Mini SD card or a Micro SD card to have the specification for connecting suiting an SD card after insertion of the Mini SD card or the Micro SD card.

2. Description of the Prior Art

Memory cards in the markets nowadays have numerous kinds, and memory cards of various brands have different sizes, this renders users to have to purchase compatible electric products in use in order to allow the memory cards to be used commonly with them.

However, among various memory cards, some are used by the identical reading mode, for instance, Mini SD cards, Micro SD cards and SD cards all are commonly used in the reading mode, they are different only in size; there have been many "Mini SD-converting into-SD adapters" in the markets to convert a Mini SD card to have the specification for connecting suiting an SD card, with which the Mini SD card can be connected through a "Mini SD-converting into-SD adapter" and applied in an electronic product that can only read an SD card.

Alternatively, there have been "Micro SD-converting into-SD adapters" in the markets to convert a Micro SD card to have the specification for connecting suiting an SD card, with which the Micro SD card can be transferred through a "Mini SD-converting into-SD adapter" to be applied in electronic products that can only read an SD card.

However, when portable electronic products that can be carried on users' persons, for instance, PDAs, mobile phones, mobile albums, computers etc. are used to do data, image or sound access, if their specifications for connecting suit SD cards, a "Mini SD-converting into-SD adapter" or a "Micro SD-converting into-SD adapter" are often used to do connecting for Mini SD cards or Micro SD cards, so that data can be up loaded or down loaded.

For a consumer, when in use, he must purchase two kinds of adapters (a "Mini SD-converting into-SD adapter" and a "Micro SD-converting into-SD adapter") for specification converting. In other words, this may induce inconvenience for a user in carrying, and is subjected to making confusing in use.

SUMMARY OF THE INVENTION

In view of the problems resided in the technique of the prior art, the main purpose of the present invention is to design a 2-in-1 card-insertion type memory card adapter that renders a Mini SD card or a Micro SD card to connect to an electric product having an SD card insertion port through connecting of the adapter.

The 2-in-1 card-insertion type memory card adapter of the present invention is in coincidence with the size of an SD card and the specification for connecting of the SD card to convert one of a Mini SD card and a Micro SD card. The adapter comprises at least a housing, a base plate with pins and a positioning rack.

Wherein the housing meets the size of an SD card, it is provided on its front end with a plurality of windows for a plurality of electric conducting sheets having at their rear end a fitting groove meeting the size of a Mini SD card for positioning the card after insertion;

the base plate with pins is provided in the housing, the electric conducting sheets are provided in opposition to the windows for the electric conducting sheets which meet the specification for connecting of the SD card; the base plate has thereon a first pin set and a second pin set, the first pin set and the second pin set are electrically connected with the electric conducting sheets; and the base plate can be provided with a plurality of holes, a lower lid is provided thereon with a plurality of studs to be molded in opposition to the holes and to be abutted against an inner lid. When a Mini SD card is inserted in the fitting groove for positioning, the first pin set is exactly connected with the Mini SD card;

The above mentioned positioning rack meets the size of a Mini SD card, and is provided thereon with a positioning portion for positioning of the Mini SD card; when the positioning rack is inserted in the fitting groove for positioning, the second pin set can be exactly connected with a Micro SD card; when it is desired to have the Micro SD card positioned in the 2-in-1 card-insertion type memory card adapter, the Micro SD card shall be inserted in the positioning rack for positioning firstly, then the positioning rack having the Micro SD card positioned therein is inserted in the fitting groove, thus the Micro SD card is indirectly positioned in the fitting groove to be connected with the second pin set.

Accordingly, the 2-in-1 card-insertion type memory card adapter can afford direct insertion of a Mini SD card therein for connecting; alternatively, it can afford indirect insertion for connecting of a Micro SD card therein through positioning of the positioning rack.

Besides, providing of the above mentioned housing can have the following three kinds of technical measures:

1. The structure of the housing includes a lower lid, an upper lid connecting with the lower lid for sandwiching the base plate having thereon pins and for obscuring the base plate having pins; the upper lid is made of plastic and is connected with the lower lid to render the housing to present a contour looking like that it is formed completely of plastic.
2. The structure of the housing includes a lower lid, an upper lid connecting with the lower lid for sandwiching the base plate having thereon pins and for obscuring the base plate having pins; the upper lid is made of metal and can cover the lower lid to render the housing to present a contour looking like that it is formed on one side of plastic, and on the other side of metal.
3. The structure of the housing includes a lower lid, an inner lid connecting with the lower lid for sandwiching the base plate having thereon pins, an upper lid connecting with the lower lid for sandwiching the base plate having thereon pins and for obscuring the base plate having pins; wherein the inner lid is made of plastic, the upper lid is made of metal to render the housing to present a contour looking like that it is formed on one side of plastic, and on the other side partially of metal and partially of plastic.

As comparing with the prior art, the present invention at least has the following effects:

1. The same adapter can afford connecting of memory cards of two different kinds of specifications; it has an effect of being convenient for carrying.
2. The first and the second pin sets are provided on the base plate having thereon pins, thereby when the housing deforms by exerting of an external force, distances between the pins and the electric connecting effect originally obtained will not be affected directly; especially, the upper lid and the lower lid of the housing are connected with each other by adhering or high frequency means, the technical measure provided in the present invention is evidently superior to the prior art in fixing the pin sets and in the effect of electric connecting of the pin sets.

3. Additionally, the technical measure that the two pin sets are arranged on the base plate can render the adapter more efficient in assembling and manufacturing.

The present invention will be apparent after reading the detailed description of the technical measures of the preferred embodiment thereof in reference to the accompanying drawings.

DETAILED DESCRIPTION OF THE PREFERRED EMBODIMENT

Figure 1:
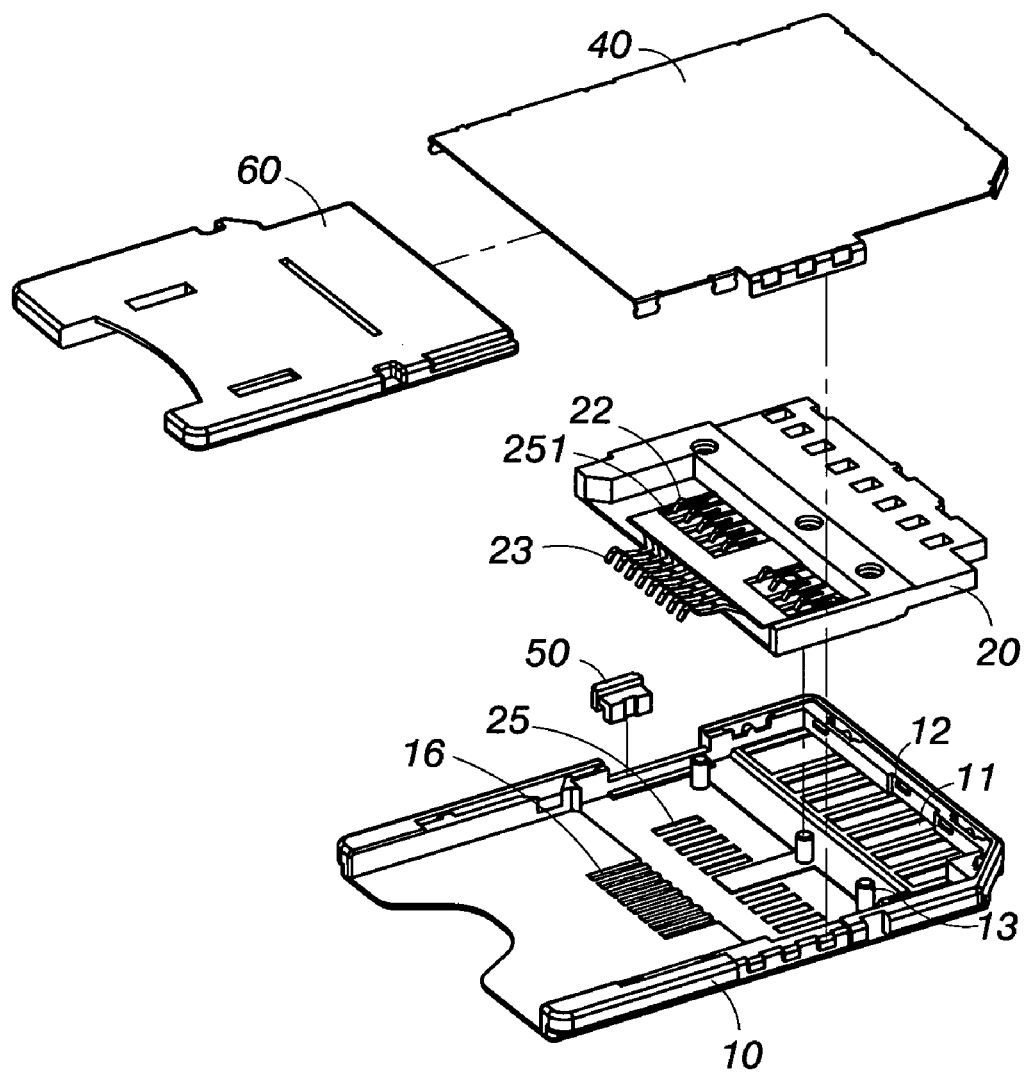
FIG. 1 is an anatomic perspective view of a first embodiment of the present invention.

Referring to FIG. 1 which is an anatomic perspective view of the first embodiment of the present invention, wherein the 2-in-1 card-insertion type memory card adapter comprises: a lower lid 10, a base plate 20 having thereon pins, an upper lid 40, a slide block 50 for preventing reading/writing and a positioning rack 60. Wherein the lower lid 10 and the upper lid 40 form a housing meeting the size of an SD card, and the lower lid 10 is a structure somewhat in the form of a U shaped disk having on its front end a plurality of windows 11 for electric conducting sheets 21, the lower lid 10 is provided thereon with a plurality of ribs 12 and studs 13 to be molten, while the slide block 50 for preventing reading/writing is provided for an electric product having an SD card insertion port for distinguishing to prevent reading/writing. In the first embodiment, the upper lid 40 is made of metal, and is engaged with the lower lid 10.

Figure 2:
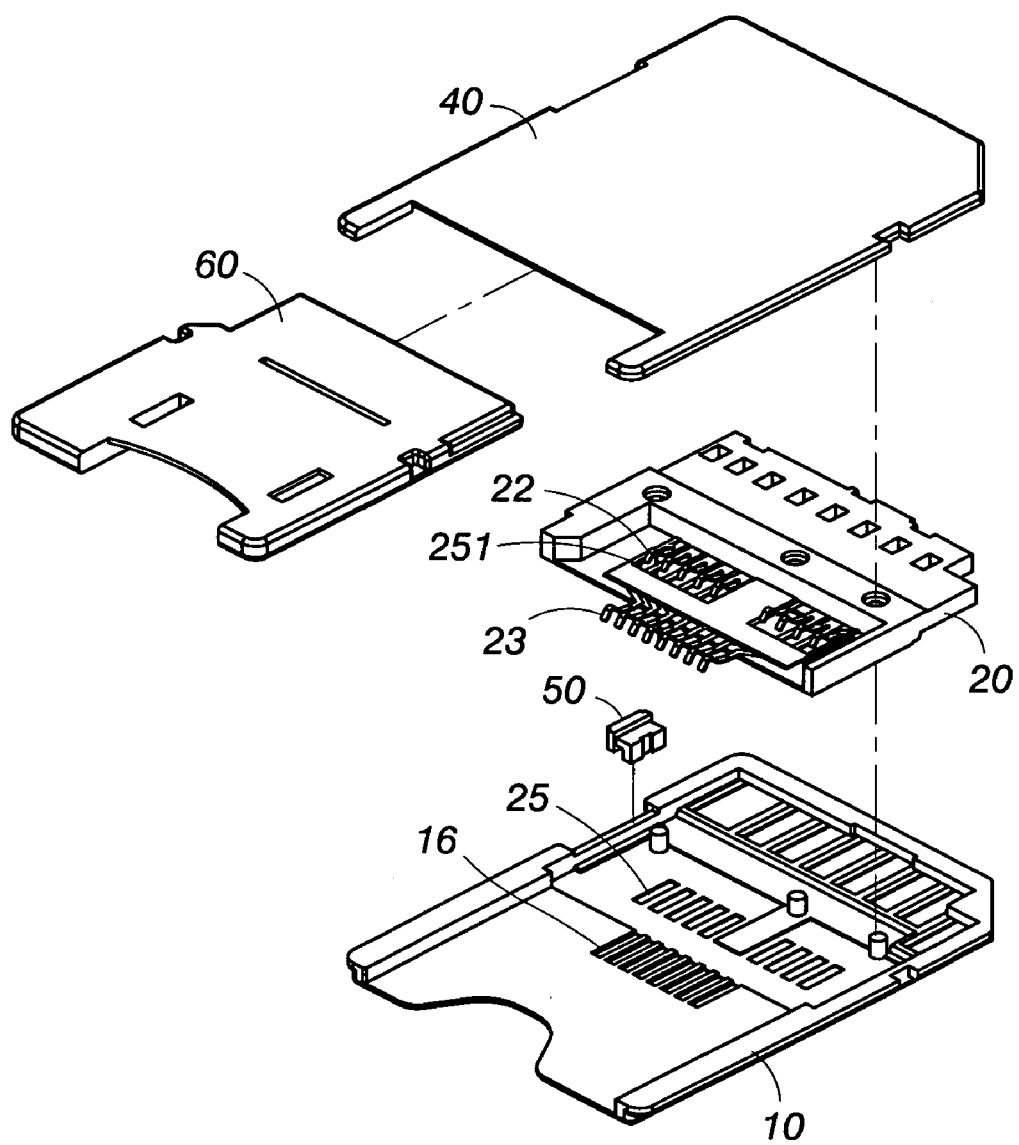
FIG. 2 is an anatomic perspective view of a second embodiment of the present invention.

FIG. 2 is an anatomic perspective view of a second embodiment of the present invention, wherein the 2-in-1 card-insertion type memory card adapter comprises: a lower lid 10, a base plate 20 having thereon pins, an upper lid 40, a slide block 50 for preventing reading/writing and a positioning rack 60. Wherein the upper lid 40 is made of plastic, and is connected with the lower lid 10.

Figure 3:
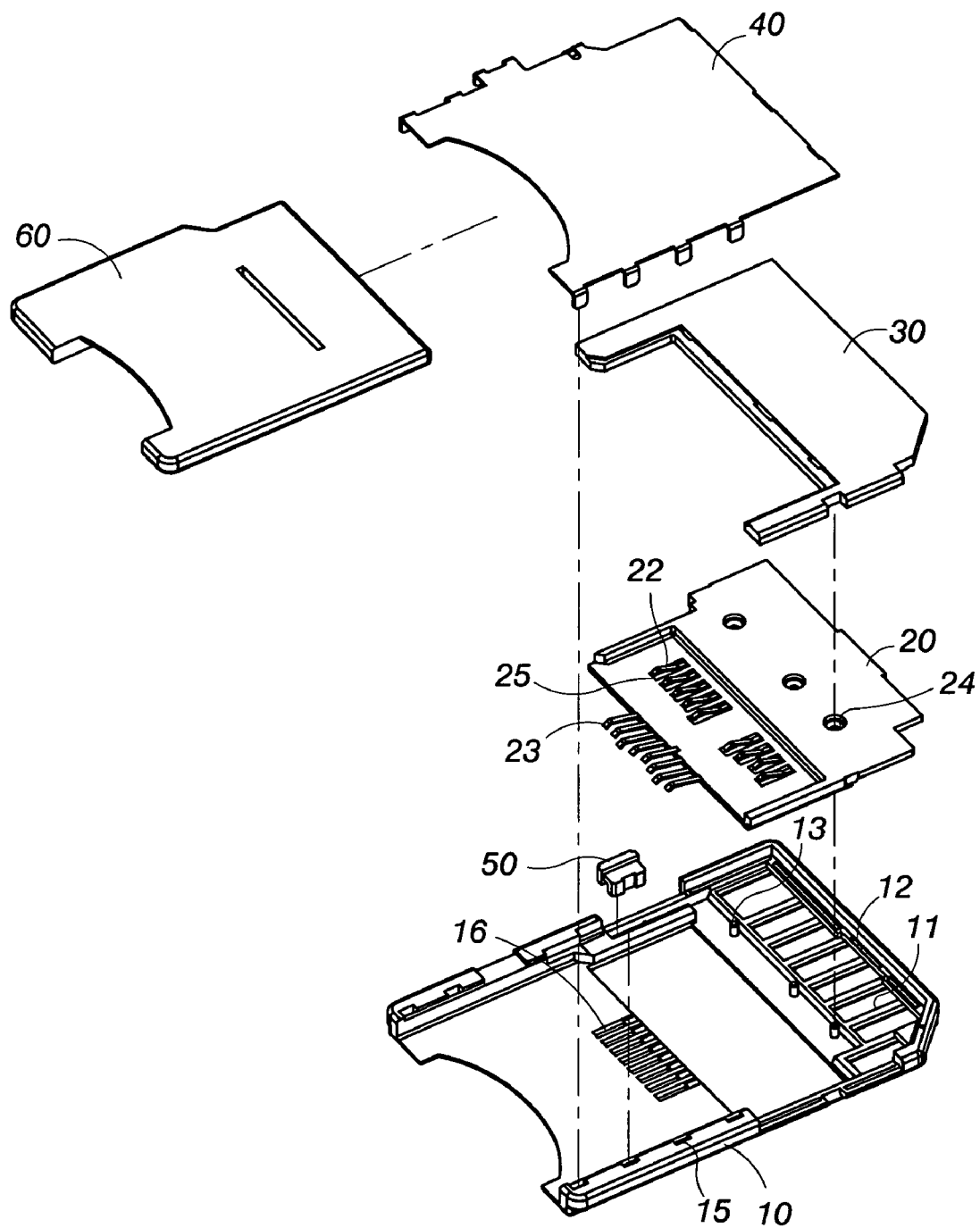
FIG. 3 is an anatomic perspective view of a third embodiment of the present invention.

FIG. 3 is an anatomic perspective view of a third embodiment of the present invention, wherein the 2-in-1 card-insertion type memory card adapter comprises: a lower lid 10, a base plate 20 having thereon pins, an inner lid 30, an upper lid 40, a slide block 50 for preventing reading/writing and a positioning rack 60. In this embodiment, the inner lid 30 is made of plastic, while the upper lid 40 is made of metal. The lower lid 10, the inner lid 30 and the upper lid 40 form a housing meeting the size of an SD card, and the lower lid 10 is a structure somewhat in the form of a U shaped disk having on its front end a plurality of windows 11 for electric conducting sheets 21, the lower lid 10 is provided thereon with a plurality of ribs 12 and studs 13 both to be molten, while the slide block 50 for preventing reading/writing is provided for an electric product having an SD card insertion port for distinguishing to prevent reading/writing.

Figure 4:
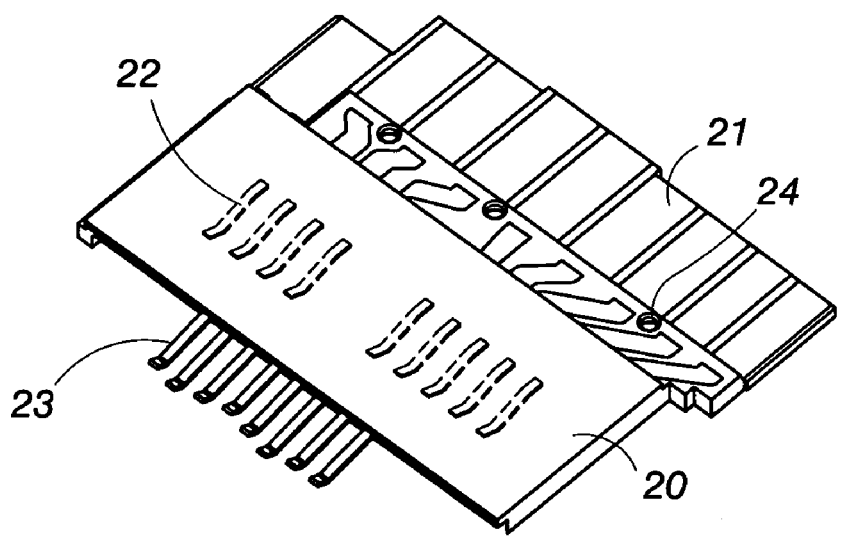
FIG. 4 is a schematic rear view of a base plate having thereon pins of the third embodiment of the present invention.
Figure 5:
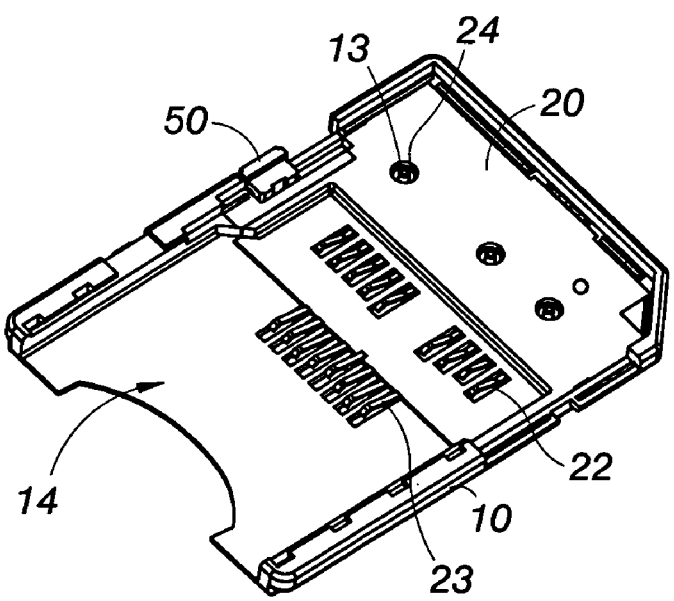
FIG. 5 is a schematic view showing a lower lid and the base plate having thereon pins of the third embodiment of the present invention after assembling.

Referring simultaneously to FIGS. 3, 4 and 5, the rear side of the base plate 20 having thereon pins is provided at a place in opposition to the windows 11 with the electric conducting sheets 21, the electric conducting sheets 21 meet the specification for connecting of an SD card; the base plate 20 has thereon a first pin set 22 and a second pin set 23, the first pin set 22 and the second pin set 23 are electrically connected with the electric conducting sheets 21; and the base plate 20 is provided with a plurality of holes 24 in opposition to the studs 13 to be molten; after assembling of the lower lid 10 with the base plate 20, it forms on its rear end a fitting groove 14 for positioning a card with a size of that of a Mini SD card when the latter is inserted in.

One thing is worth mentioning, in practicing, the 2-in-1 card-insertion type memory card adapter can be provided beneath the first pin set 22 with a corresponding non-penetrated first retracting groove set 25 to allow the first pin set 22 to elastically retract during its action of connecting; further the 2-in-1 card-insertion type memory card adapter can be provided with a non-penetrated second retracting groove set 16 to allow the second pin set 23 to elastically retract during its action of connecting.

Performance of the first retracting groove set 25 can be as shown in FIGS. 1 and 2, the base plate 20 is provided beneath the first pin set 22 with a penetrated first retracting groove hole-set 251, and the non-penetrated first retracting groove set 25 is provided on the lower lid 10 at a place in opposition to the penetrated first retracting groove hole-set 251. In this mode, when the first pin set 22 elastically retracts during its action of connecting, it penetrates the base plate 20 via the first retracting groove hole-set 251 into the non-penetrated first retracting groove set 25.

Figure 6:
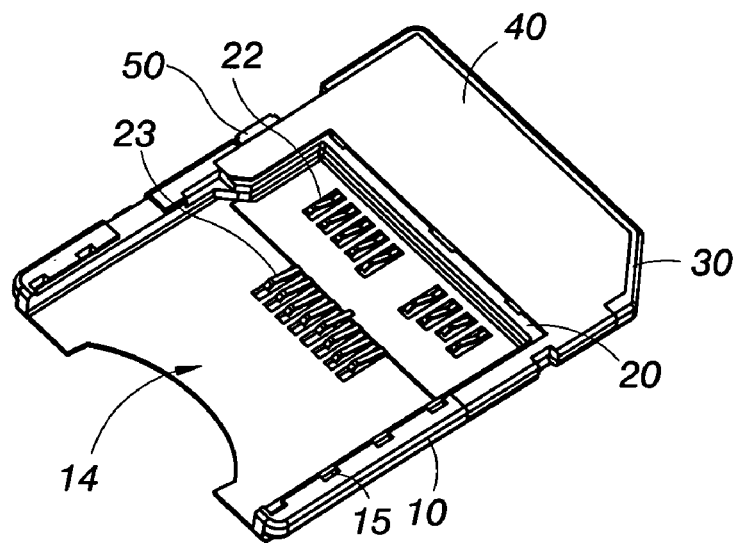
FIG. 6 is a schematic view showing the lower lid, the base plate having thereon pins and an inner lid of the third embodiment of the present invention after assembling.

Referring to FIGS. 4 and 5, in order to render the base plate 20 to get a better effect of positioning, the inner lid 30 can be connected by means of high frequency melting onto the lower lid 10 to sandwich the base plate 20, the state after sandwiching is as shown in FIG. 6.

Figure 7:
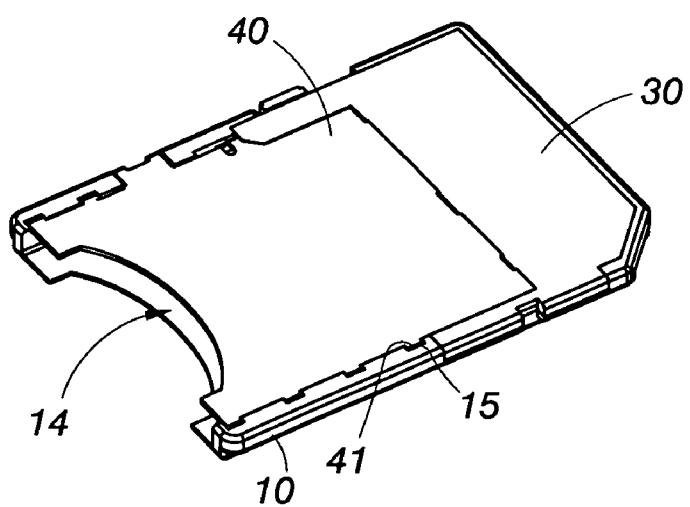
FIG. 7 is a schematic view showing the lower lid and an upper lid the third embodiment of the present invention after assembling.

Referring to FIG. 7, in practicing, the upper lid 40 is made of plastic to be connected onto the lower lid 10; alternatively, it can be made of metal to be engaged with the lower lid 10. The upper lid 40 is engaged with the lower lid 10 to obscure the base plate 20, meantime, the fitting groove 14 can be formed an area having a one-way opening, and the upper lid 40 is provided on its two lateral sides with a plurality of upper lid fixing and engaging grips 41, the upper lid fixing and engaging grips 41 cooperate with a plurality of fixing and engaging slots 15 provided on the lower lid 10 to make engagement of the upper lid 40 with the lower lid 10.

Figure 8:
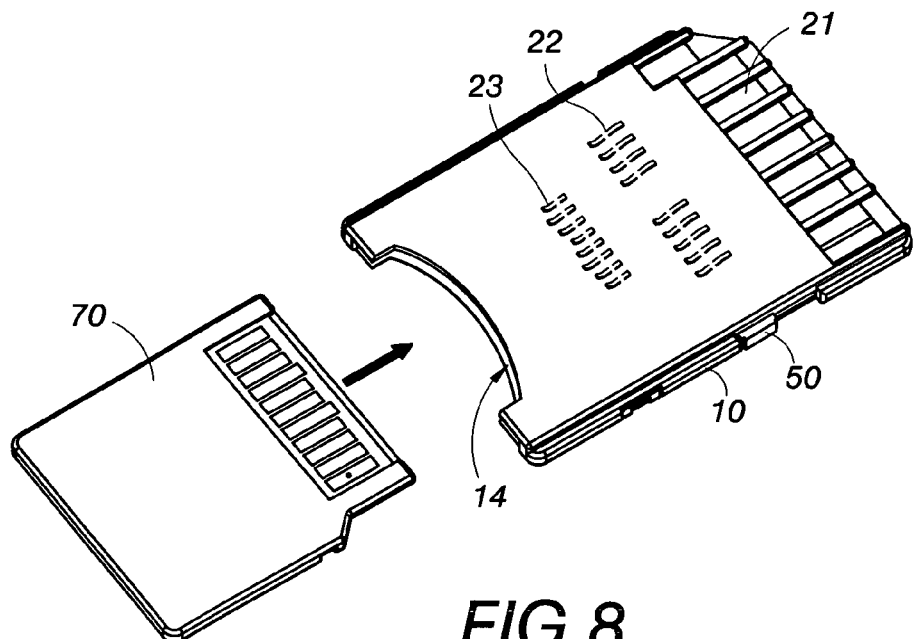
FIG. 8 is a schematic view showing direct inserting of a Mini SD card in the third embodiment of the present invention.

Referring to FIG. 8, by the fact that the fitting groove 14 can allow positioning of a memory card with the size meeting a Mini SD card after insertion, a Mini SD card 70 can thus be directly inserted into the fitting groove 14 from the rear end of the fitting groove 14 to effect positioning; and when the Mini SD card 70 is inserted into the fitting groove 14 and is positioned, the first pin set 22 can exactly electrically connect with the Mini SD card 70.

Figure 9:
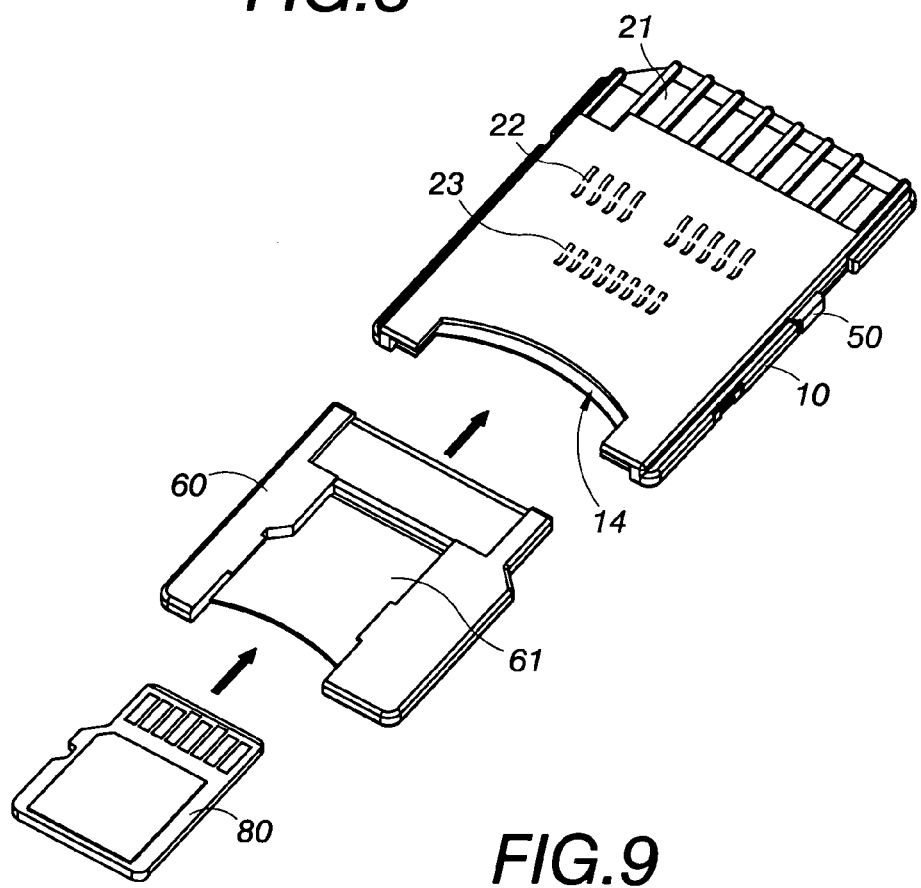
FIG. 9 is a schematic sectional view showing indirect insertion connecting of a Micro card in the third embodiment of the present invention.

As shown in FIG. 9, another feature of the present invention is, the fitting groove 14 can allow positioning of a memory card with the size meeting a Mini SD card after insertion, a positioning rack 60 meeting the size of a Mini SD card is provided, the positioning rack 60 has therein a positioning portion 61, when the positioning rack 60 is inserted in the fitting groove 14 for positioning, the second pin set 23 can be exactly connected with a Micro SD card 80; in other words, the Micro SD card 80 can be inserted in the fitting groove 14 indirectly to connect with the second pin set 23 after positioning of the positioning rack 60 in the fitting groove 14.

The specification and the drawings for the present invention are only for illustrating the preferred embodiments of the present invention, and not for giving any limitation to the scope of the present invention. It will be apparent to those skilled in this art that various equivalent modifications without departing from the spirit of this invention shall fall within the scope of the appended claims.

The invention claimed is:

1. A 2-in-1 card-insertion type memory card adapter meeting the size of an SD card and meeting a specification for connecting of said SD card, being used to make connecting of said memory card adapter with one of a Mini SD card and a Micro SD card, said memory card adapter at least comprises:

a housing meeting said size of said SD card, and provided on its front end with a plurality of windows for a plurality of electric conducting sheets having at their rear ends a fitting groove meeting the size of said Mini SD card for positioning the latter after insertion;

a base plate with pins being provided in said housing and being provided with said electric conducting sheets in opposition to said windows, said electric conducting sheets meet said specification for connecting of said SD card; said base plate has thereon a first pin set and a second pin set, said first pin set and said second pin set are electrically connected with said electric conducting sheets; when said Mini SD card is inserted in said fitting groove for positioning, said first pin set is exactly connected with said Mini SD card; and a positioning rack meeting said size of said Mini SD card and being provided thereon with a positioning portion for positioning of said Mini SD card; when said positioning rack is inserted in said fitting groove for positioning, said second pin set is exactly connected with said Micro SD card.

2. The 2-in-1 card-insertion type memory card adapter as in claim 1, wherein said housing includes a lower lid and an upper lid connecting with said lower lid for obscuring said base plate having said pins.

3. The 2-in-1 card-insertion type memory card adapter as in claim 2, wherein said upper lid is made of metal.

4. The 2-in-1 card-insertion type memory card adapter as in claim 2, wherein said upper lid is made of plastic.

5. The 2-in-1 card-insertion type memory card adapter as in claim 1, wherein said housing includes a lower lid, an inner lid connecting with said lower lid for sandwiching said base plate having thereon pins, and an upper lid connecting with said lower lid for obscuring said base plate having said pins.

6. The 2-in-1 card-insertion type memory card adapter as in claim 5, wherein said upper lid is made of metal.

7. The 2-in-1 card-insertion type memory card adapter as in claim 5, wherein said upper lid is made of plastic.

8. The 2-in-1 card-insertion type memory card adapter as in claim 5, wherein said base plate is provided with a plurality of holes, said lower lid is provided thereon with a plurality of studs to be molten in opposition to said holes and to be abutted against said inner lid.

* * * * *